(No Model.)
J. A. LAEMLE.
DEVICE FOR CUTTING OFF THE FLOW OF GAS, &c., IN CASE OF FIRE.
No. 291,061. Patented Jan. 1, 1884.
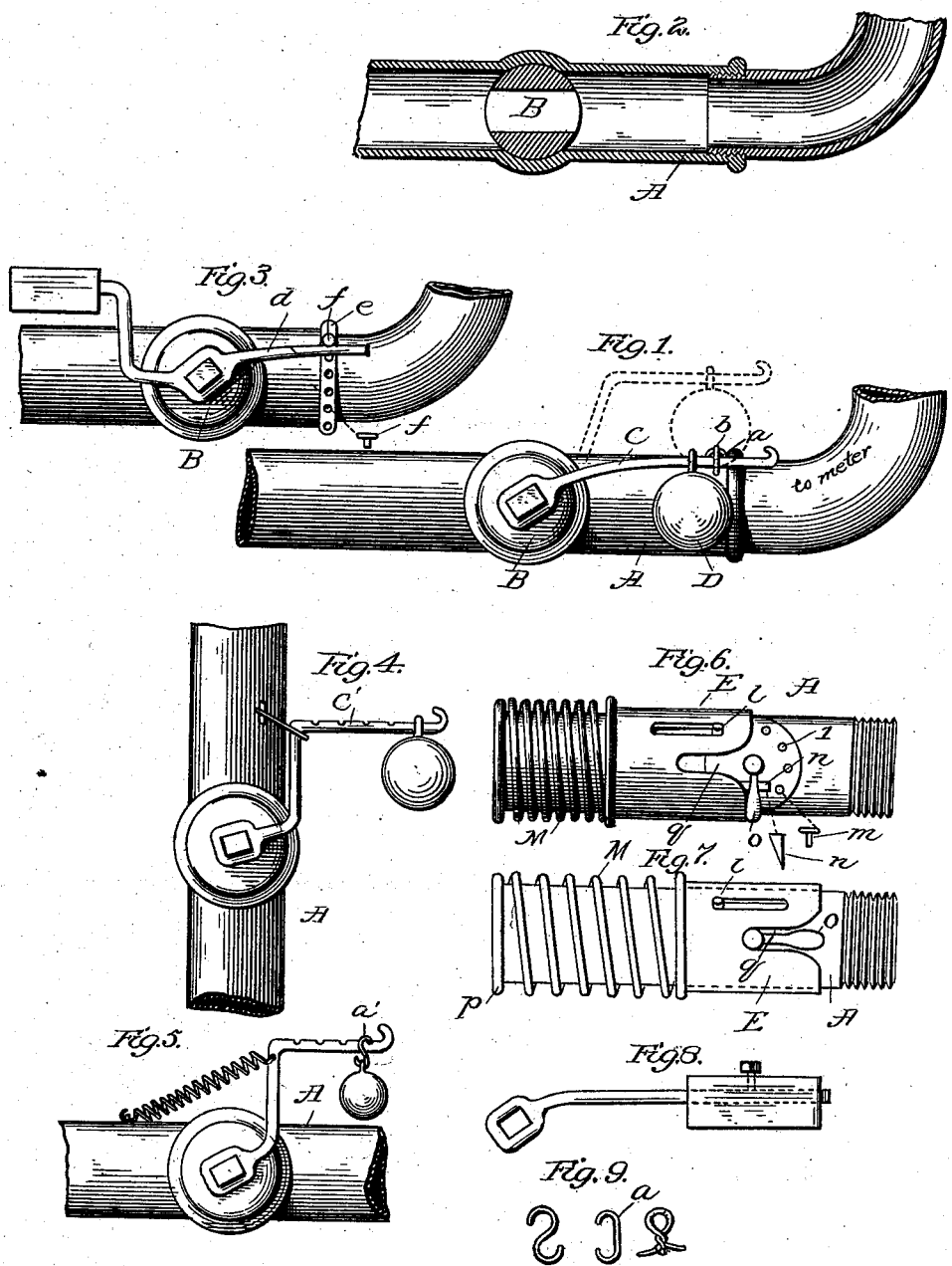
WITNESSES
INVENTOR
J. A. Laemle
By Joyce & Spear
Attorneys

UNITED STATES PATENT OFFICE.

JOSEPH A. LAEMLE, OF STAPLETON, NEW YORK.

DEVICE FOR CUTTING OFF THE FLOW OF GAS, &c, IN CASE OF FIRE.

SPECIFICATION forming part of Letters Patent No. 291,061, dated January 1, 1884.

Application filed May 28, 1883. (No model.)

*To all whom it may concern:*

Be it known that I, JOSEPH A. LAEMLE, of Stapleton, Staten Island, and State of New York, have invented a new and useful Improvement in Device for Cutting Off Flow of Gas, &c., in Case of Fire; and I do hereby declare that the following is a full, clear, and exact description of the same.

My invention is a device for regulating the flow of gas to meters and for automatically cutting off the flow of gas in case of fire in the building, and also for regulating and cutting off the flow of liquids. Heretofore safety gas-cocks have been devised for this purpose, acting simply as cut-offs in case of fire, with internal fusible connections with the valve.

My object is to provide a device which shall have a fusible or combustible connection or fastening for the valve on the outside, where it will be more readily exposed to heat or flame, and at the same time may be used as a regulator of the flow.

In the accompanying drawings, Figure 1 shows a side elevation of the improved device. Fig. 2 shows a section of the tube and valve. Figs. 3, 4, and 5 show modifications of the lever and its connections for operating the valve. Figs. 6 and 7 represent a form in which a spring is substituted for a weight. Fig. 8 shows a modified form of weight. Fig. 9 represents fusible connections.

In these figures, A represents the pipe leading from the gas-main or street-pipe to the meter. In it is placed the ordinary valve, B, adapted by turning to reduce the flow of gas or to turn it off altogether. This valve has a stem projecting through the wall of the pipe, square or polygonal on its outer end, and fitted to receive a lever, C, which is in the form of a wrench. This lever projects alongside the pipe, and is provided with a weight, D, sufficient, when not restrained, to depress the lever and close the valve. It is ordinarily held up, however, by a fusible or combustible connection, a, such as those shown in Fig. 9, or of any suitable shape if they are of fusible metal; but the connection may be simply a combustible string such as tarred rope or twine. A suitable loop, ring, or stud is fixed to the pipe, as at b, to make the connection with the pipe. When unusual heat has melted or burned the connection between the lever and the pipe, the weight falls, turns the valve, and shuts off the gas. The length of the connection determines the position of the lever, and the valve may therefore be set in any position to regulate the flow of the gas.

In Fig. 3 the lever is double, having an arm, d, in shape similar to that shown in Fig. 1. This arm extends past a plate, e, fixed on the pipe, with a series of holes arranged vertically. A fusible pin, f, is set in any one of these holes, according to the position desired for the valve. When the pin melts, the weight falls and turns the valve.

In Fig. 4 is shown a form adapted to vertical pipes. In this the lever C' is bent at right angles, and at the elbow is connected by a fusible or combustible link, hook, or tie to a pin in the pipe, or by a combustible or other tie to a fusible pin. Where a combustible tie is used, it will take fire readily from any flame before the heat is sufficient to melt the fusible pin, and thus a double safeguard be provided. In any of the forms heretofore described this double safeguard may be used.

In Fig. 5 the lever is the same as that heretofore explained in connection with Fig. 4; but a spring is relied on to draw the lever back when the melting or burning of the connection a' releases the counterbalancing-weight. The position of the weight in this may be changed into any one of a series of notches to adjust the device.

Fig. 8 shows a convenient form of weight to be against the pipe, and Fig. 9 suitable forms of connections.

In Figs. 6 and 7 are shown other modifications in which a spring is used to perform the functions of the weight heretofore described. This form is adapted better to certain circumstances. A sleeve, E, slides freely on the pipe within limits determined by the pin l in the slot of the sleeve, and is forced forward by a spring, M, between collar p and sleeve. The front end of the sleeve is notched deeply, as shown at q, on a line with the stem of the valve. To this stem a lever, o, is fixed, and when the sleeve is forced forward it moves the lever from the position of Fig. 6—i. e., the open position of the valve—to that shown in Fig. 7 in which the valve is closed. The sleeve may be held back by a fusible wedge, *n*, or by a pin, *m*, set in any one of the series of holes 1.

It will be obvious that the same devices can be used to regulate and cut off entirely the flow of liquids in a similar manner, and in the case of gasoline-tanks and the like a perfect security would be secured by the use of this device against the fire spreading to the tank and causing the explosions which so often happen, and which are so fatal to human life.

By the devices described the ordinary stop-cock may be dispensed with, as the flow of gas or liquid may be shut off by hand as well as by the automatic action of the device.

I do not limit myself to the application of the above-described devices to the pipe leading to the meter, as they may be placed at any point in the building where it would be desirable to have the gas cut off in case a fire originated in that particular section of the house.

I wish it to be understood that I do not broadly claim a weight combined with a fusible supporting or suspending device, except in the particular connection specified, as I am aware that such devices have been heretofore used in various forms to automatically control the flow of water in case of fire.

Having thus described my invention, what I claim is—

1. In combination with the gas-pipe of a building, a valve held normally open, having a stem and lever outside of the pipe, a weight or spring tending to force said lever against the pressure of the gas to close the valve, and a combustible or fusible connection outside the pipe holding said lever till melted or consumed, substantially as described.

2. The combination of the valve in the gas-pipe, having its stem projecting through the pipe, a lever connected therewith, means, substantially as described, for forcing said lever to close the valve, and fusible or combustible devices for holding said lever to keep the valve open, said devices being adjustable, whereby the lever and valve may be set at an angle, substantially as set forth.

In testimony whereof I have signed my name to this specification in the presence of two subscribing witnesses.

JOS. A. LAEMLE.

Witnesses:
F. L. MIDDLETON,
WALTER DONALDSON.